June 19, 1934.   R. B. BAGBY   1,963,878
BUTTER RECEPTACLE
Filed June 8, 1931
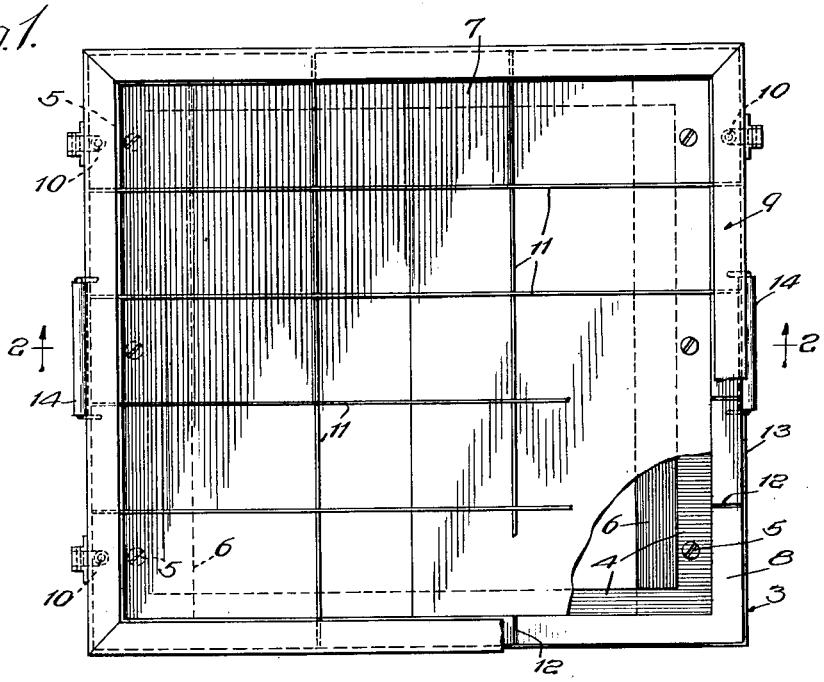
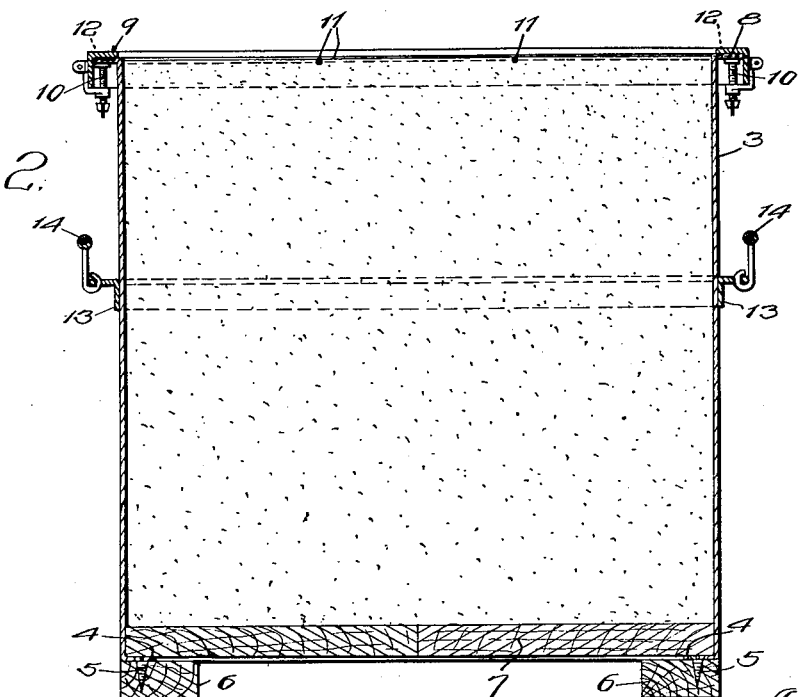

Patented June 19, 1934

1,963,878

UNITED STATES PATENT OFFICE 1,963,878

BUTTER RECEPTACLE

Ralph B. Bagby, Evanston, Ill.

Application June 8, 1931, Serial No. 543,033

1 Claim. (Cl. 31—5)

This invention relates to receptacles of the kind used in the manufacture and handling of butter which heretofore have usually been made of wood. Such wooden receptacles are not entirely satisfactory as they warp due to intermittent moistening and drying thereof. Again, wooden receptacles absorb moisture from the butter. Moreover, it is necessary that the receptacles be thoroughly cleaned so that the butter will be sweet and pure and this may be best accomplished by sterilizing, but it is very difficult to sterilize a wooden receptacle. These and other disadvantages may be overcome by the use of metal receptacles, but this is not without objection for butter has been found to adhere to metal. Butter, however, does not adhere to moistened wood and therefore the use of wooden receptacles in butter manufacturing and handling is prevalent. The salient object of my invention is to provide a novel metal receptacle to which butter will not adhere and which will overcome the disadvantages of wooden receptacles.

During the manufacture of butter it is introduced into a receptacle, known as a butter box, and after being cooled, the butter is forced from the receptacle past suitable scoring devices to be divided into prints. Butter boxes customarily have been made of wood and because of the change of volume, due to warping and the like, these boxes have been made of slightly greater volume than would be required if the volume thereof could be kept constant. As a result, a quantity of butter usually remains in the box after the scoring into prints, which is scrap and is usually re-churned or otherwise re-worked. A specific object of my invention is to provide a butter box of constant volume so that the scrap will be reduced to a minimum.

A further and ancillary object of the invention is to score butter by forcing it from a butter box through a scoring device fast to the box.

Other and further objects will appear hereinafter.

In the selected embodiment of my invention illustrated in the accompanying drawing Fig. 1 is a top plan view of a butter box having a scoring device associated therewith, certain parts being broken away; and Fig. 2 is a transverse vertical sectional view taken substantially on the line 2—2 on Fig. 1.

Wooden receptacles employed in the manufacture and handling of butter are moistened prior to the use thereof. The moisture collects in the pores of the wood and prevents adherence of the butter to the receptacle, but while this moisture collection in the pores of the wood has this advantage, it entails a serious disadvantage in that the wood, by reason of its porosity, absorbs moisture from the butter which has about a sixteen percent by weight moisture content. Resort has been had to metal receptacles to prevent this absorption of moisture from the butter, but the butter adhered to the walls of such receptacles and could not be easily discharged from the receptacles. My invention permits the use of metal receptacles and therefore obviates the absorption of moisture from the butter. Adherence of the butter to the metal is prevented by providing a multiplicity of microscopic recesses or pockets in the butter engaging surfaces of the receptacle. Moisture will collect in these pockets and will prevent the adherence of butter to the walls of the receptacle and as the metal is not porous, only sufficient moisture will be absorbed from the butter to maintain a supply of moisture in the pockets.

The receptacle may be made of any metal which of itself will not contaminate the butter and I have found that so-called stainless steel may be used very advantageously. Stainless steel, containing sixteen to eighteen percent chromium, eight to ten percent nickel, six one-hundredths percent carbon, and substantially seventy percent iron, has been found to be satisfactory. While stainless steel may be used very advantageously, the invention is not limited to the use of such material.

The receptacles are formed from sheet metal and when stainless steel is used I pickle the sheets in the usual manner and arrest the pickling action by dipping the sheets into a nitric acid solution. In the pickling process, the surface of the sheets is attacked by the pickling acid with the result that a multiplicity of microscopic pockets are formed in this surface. The entire receptacle may be pickled, if desired, and I have found that pickling is an advantageous manner of producing the pockets or otherwise roughening the surface of the sheet. However, the surface of the sheet may be roughened by mechanical means as, for example, by using suitably roughened rollers in the rolling operations performed on the sheet, and the pockets may also be formed by peening the surface of the sheet.

In the illustrated embodiment of the invention I have shown a butter box comprising a housing 3. At the lower ends of the walls of the housing I provide inturned flanges 4 and in flanges along opposite walls I provide openings through which securing devices, such as the screws 5, may be passed to retain the cleats 6 in position. While I have shown the cleats as being made of wood, it is to be understood that the use of metal cleats or other devices for spacing the bottom of the receptacle from the support on which it is rested may be employed. The bottom 7 of the receptacle, which rests on the flanges 4 to be freely movable therefrom, is also shown as being made of wood but, if desired, metal, treated in the manner in which the metal employed in the walls of the receptacle is treated, may be used. At the upper ends of the walls of the housing 3, outwardly extending flanges 8 are provided. The butter scoring device, used with the butter box, consists of a frame 9 formed of substantially L-shaped channel strips that are rested on the flanges 8 with corresponding portions thereof depending below these flanges. Clamp bolts 10 are swivelly mounted on the frame 9 and engage the underside of the flanges 8 to thereby clamp the frame to the box. Scoring wires extend longitudinally and transversely of the frame 9, and the scoring wires extending between opposite sides of the frame are interwoven with the scoring wires extending between other sides of the frame whereby areas of predetermined size are defined between these wires. The upper faces of the flange 8 are grooved, as at 12, to receive and properly locate the scoring wires 11. Reenforcing strips 13 extend about the housing 3, and handles 14 are pivotally mounted thereon which facilitate transportation of the box.

In use, the box is filled with butter, which is then thoroughly chilled. The bottom 7 is then caused to move through the housing 3 in a step-by-step manner whereby the butter is forced past the scoring wires 11. During the at rest periods in the step-by-step movement, a cutting device is moved through the butter above the frame 9 and therefore the butter is divided into prints. The inner roughened walls of the housing 3 will be thoroughly moistened before the butter is introduced into the box, and this moisture affords sufficient lubrication to prevent adherence of the butter to the walls of the box. Sufficient moisture may be absorbed from the butter to maintain the walls in a moistened condition, but this absorption will be so small that it will not be detrimental.

As there will be no tendency to warp in a metal box, I am enabled to accurately determine the volume thereof, and therefore very little scrap will result from the use of the box. Furthermore, since the metal will not absorb moisture, it will not increase in weight and consequently the tare weight may be stamped thereon, which will facilitate the handling of the butter as the net weight of the butter may be easily determined. Moreover, the heat conductivity of metal is relatively high, and this will facilitate cooling of the butter after it has been introduced into the box. An additional advantage accruing from metal boxes is that such boxes will withstand rough usage and consequently will be long-lived.

I have shown and described my invention as embodied in a butter box of a particular kind and adapted for use with scoring devices, but it is to be understood that the invention is not limited to the particular type of butter box shown nor is it limited to use with butter boxes, for my invention resides in the use of roughened surface metal and it is within the purview of my invention to manufacture churns and other butter manufacturing and handling devices of such metal, for it is advantageous in all such devices to prevent the adherence of the butter to the walls thereof, and this may be done, as I have previously described, by providing a surface on which moisture may collect as this will prevent butter adherence.

While I have illustrated and described a preferred form of my invention it is to be understood that this is capable of variation and modification and I therefore do not wish to be limited to the precise details set forth but desire to avail myself of such changes and alterations as fall within the spirit and scope of the following claim:

I claim:

A metal apparatus for use in the manufacture and handling of butter and made from a metal non-corrosible by butter or moisture and having a multiplicity of minute pockets in the butter engaging surface thereof whereby moisture from butter contacted with said surface collects in the pockets to prevent adherence of the butter to the surface so that butter may be freed from said surface upon relative sliding movement of the butter and the surface.

RALPH B. BAGBY.